Figure 1:
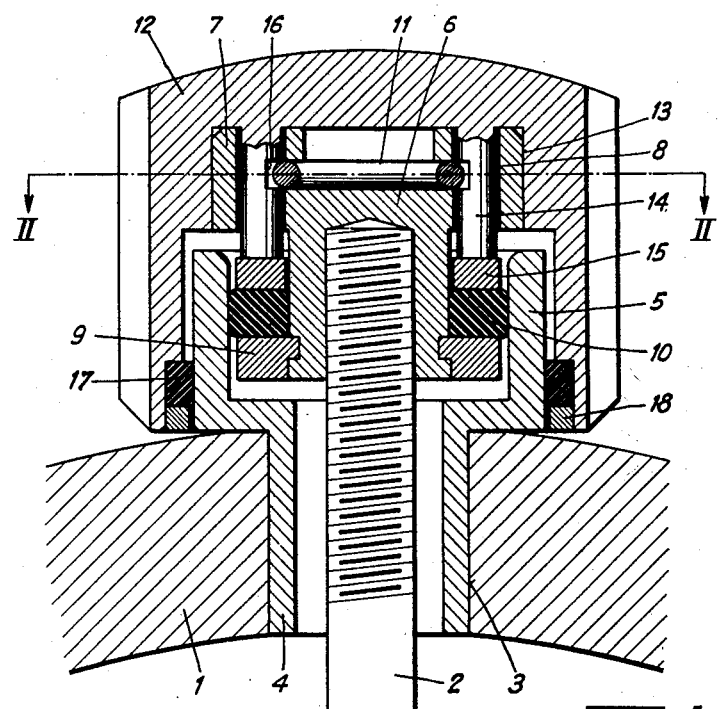

April 20, 1965   PIERRE-ANTOINE NARDIN   3,178,879
CONTROL DEVICE FOR A MECHANISM LOCATED IN A CASING
Filed Dec. 23, 1963   4 Sheets-Sheet 1

United States Patent Office 3,178,879
Patented Apr. 20, 1965

3,178,879
CONTROL DEVICE FOR A MECHANISM
LOCATED IN A CASING
Pierre-Antoine Nardin, Rue Beau-Site 13,
Le Locle, Switzerland
Filed Dec. 23, 1963, Ser. No. 332,573
Claims priority, application Switzerland, Dec. 27, 1962,
15,206/62
6 Claims. (Cl. 58—90)

This invention relates to devices for controlling a mechanism located in a casing, and in particular to devices for controlling such a mechanism from outside the casing through a passage provided in the wall thereof.

There are such control devices known in the art, which comprise a motion transmitting stem extending through the passage provided in the wall of the casing, and a control member carried by the stem for actuating the same, said control member being movable between two positions; a working position, in which said control member can be actuated and drive said stem, and a closing position, in which said control member firmly presses a sealing gasket against a portion of the casing, thereby causing the gasket to tightly close the passage of the stem through the casing wall.

Control devices of this type have been used as yet chiefly with watches to actuate the winding and hand-setting stem thereof. To retain these control devices in closed position their control member has been provided with a screw thread adapted for engaging a similarly screw-threaded portion of the casing.

These known devices have, however, the draw-back that at the moment at which the control member comes, upon screwing the same, in contact with the sealing gasket provided for tightly closing the passage of the winding and hand-setting stem, it injures this gasket because of the friction said control member exerts thereon in rotating.

Control devices of the type referred to above, in which the member pressing on the sealing gasket in closed position comes in contact therewith upon an axial displacement, are also known in the art. These known devices have the advantage that they do not expose the gasket to any wear due to a friction. These known control devices usually comprise a latching mechanism consisting of a resilient member, generally constituted by a split ring, and of a lodging having the form of an annular groove in which a part of said resilient member can spring. The two elements of the known latching mechanisms are arranged on a part of the control member and on a part of the casing, respectively.

These known devices have therefore the drawback that they require the use of a stem which can be moved into a resting position, which is different from its working position or positions, since said stem is rigdly fixed to the control member of the devce and since this control member has to be moved in axial direction in order to be put in closing position. When the control device has to permit the winding and hand-setting stem of the watch to be actuated, the use of these known devices involves several modifications of the watch movement. The setting lever and the setting lever spring, which permit the stem to be moved in winding position and in hand-setting position, must, for instance be arranged so that the stem can be moved into a third axial position. The parts of the watch movement frame guiding the stem must also be constructed in accordance with the three possible positions of the stem. Finally, the gears carried by the stem must also be arranged in view of the supplemental axial displacement thereof. The use of said known devices with a watch therefore requires a movement especially constructed with said use in view. The watch casing must similarly be designed in view of said use, because it has to carry a part of the latching mechanism provided for retaining the control member of said device in closing position. This last condition still involves the drawback that the control device can only be replaced by an identical device, when repairing the watch.

It is therefore an object of this invention to provide a control device free from the drawbacks above mentioned.

The control device according to the invention therefore comprises a control crown which can be mounted on the motion transmitting stem for actuating the same, this control crown comprising two parts assesmbled together in a single unit so that said control crown can be handled as one piece when mounting the same on to or removing it from said stem, one of said parts being movable with respect to the other part in the direction of the axis of said stem from a working position, in which said control crown can be actuated and drive said stem, to a closing position, in which said control crown and said stem remain at rest, two facing surface portions, each on one of said parts, said surface portions moving toward each other when said movable part is moved from said working position into said closing position, and an annular sealing gasket extending between said surface portions of said parts and being strongly pressed between said surface portions when said movable part is in closed position thus being able to close tightly the passage of said stem through the casing wall, said sealing gasket being relaxed when said movable part is in working position.

Further objects of the invention will still become apparent in the course of the following description.

Five embodiments of the control device improved according to the invention are represented diagrammatically and by way of example in the accompanying drawings.

Figure 2:
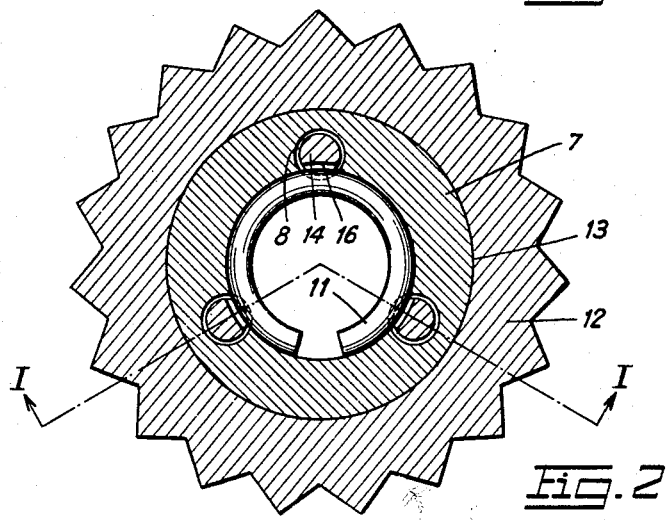
Figure 3:
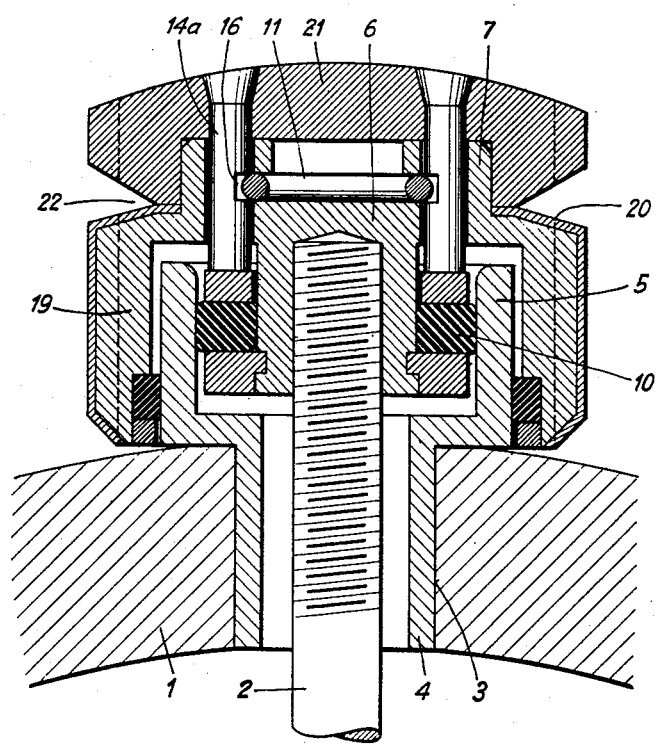
Figures 4, 6:
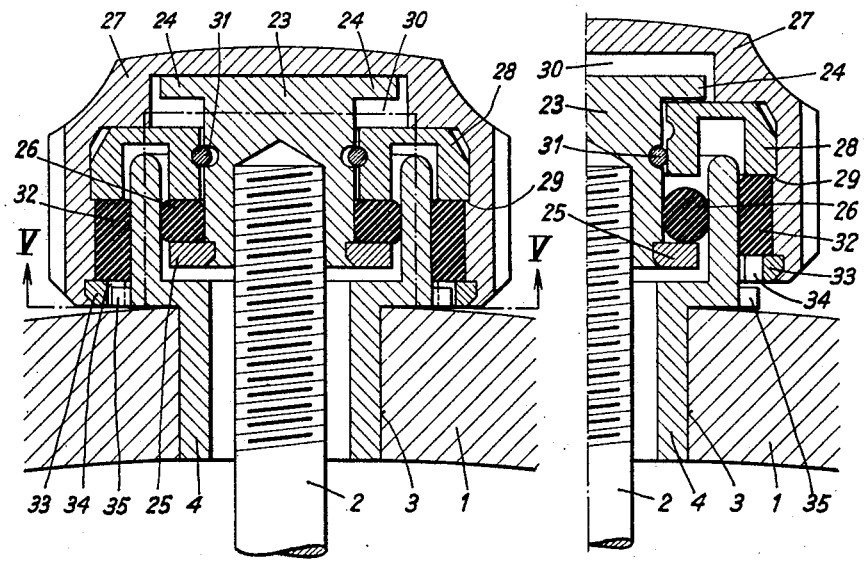
Figures 5, 7:
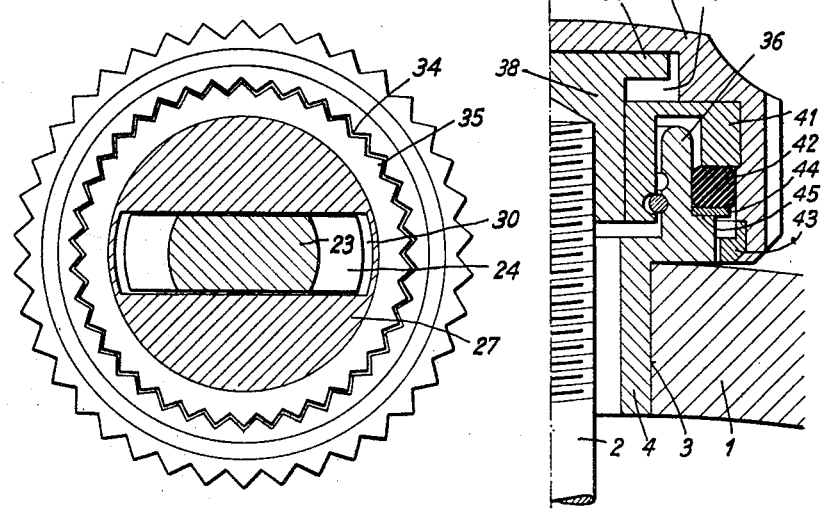
Figure 8:
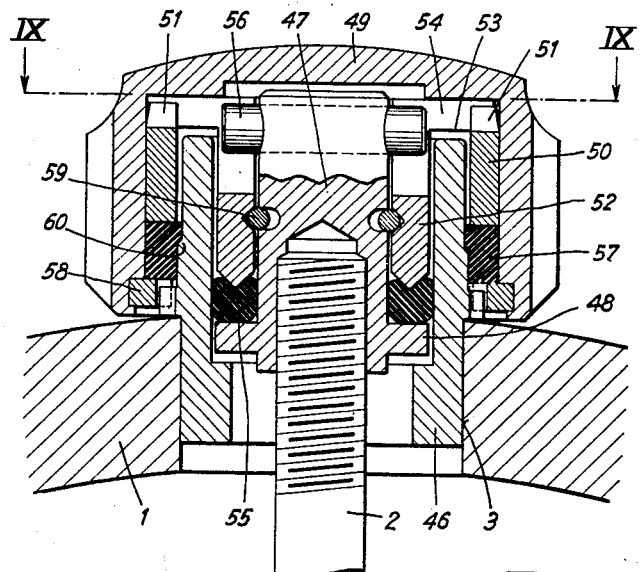
Figure 9:
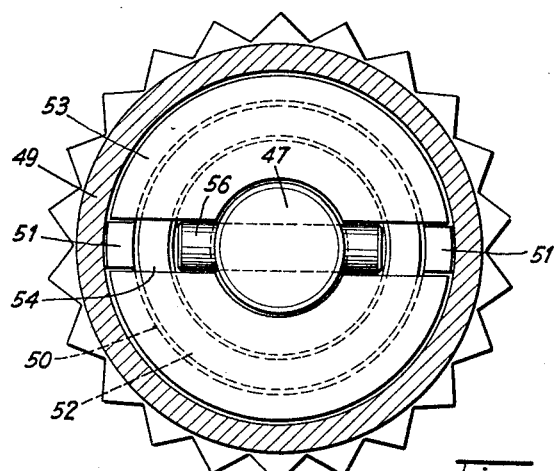

In the drawings:
FIG. 1 is an axial section along the broken line I—I of FIG. 2 of the first embodiment;
FIG. 2 is a cross-sectional view along line II—II of FIG. 1 of this first embodiment;
FIG. 3 is an axial section similar to that of FIG. 1, but showing the second embodiment;
FIG. 4 is an axial section similar to those of FIGS. 1 and 3, but showing the third embodiment;
FIG. 5 is a sectional view taken along line V—V of FIG. 4;
FIG. 6 is a part axial section showing the different members of FIG. 4 in another working position;
FIG. 7 is a part axial section similar to that of FIG. 6, but showing the fourth embodiment;
FIG. 8 is an axial section similar to those of FIGS. 1, 3 and 4, but showing the fifth embodiment, and
FIG. 9 is a cross section of this fifth embodiment taken along line IX—IX of FIG. 8.

All the control devices repersented in the drawings serve to permit the winding and hand-setting mechanisms of a watch movement (not shown) located in a casing 1 to be actuated from outside this casing by means of a usual winding and hand-setting stem 2. For this purpose, an opening 3 is provided in the wall of casing 1 and a tube serving as passage for stem 2 is set with force fit in this opening 3. The seal between the tube and the casing is tight because of the manner in which the tube is fixed to the casing. To ensure the tight closure of the casing in the vicinity of stem 2, it accordingly suffices to tightly close the passage of the stem through the tube fixed to the casing.

In the first embodiment (FIGS. 1 and 2) the tube 4 fixed to casing 1 comprises a protruding section 5 having a larger diameter than that of the tube section extending in opening 3 of casing 1. This enlarged portion of tube 4 serves to receive some parts of the control device mounted at the end of stem 2.

This control device comprises a first part rigidly connected to stem 2. This part substantially consists of a body member 6 provided with a tapped bore by means of which it is screwed onto the end of stem 2. This body member 6 is made integral with a collar 7 provided with three axial apertures 8. A ring 9 is fixed to body member 6 in order to retain a sealing gasket 10 axially in place on said body member. A split ring 11 serving as latch is mounted in an annular groove of collar 7.

The control device represented further comprises a second part mounted on said first part and shiftable in axial direction with respect thereto. This second part substantially consists of a control member 12, the outer shape of which is similar to that of the usual winding and hand-setting crowns. For guiding the second part of the control device represented the control member 12 is formed with a cylindrical guiding surface 13 adjusted on to collar 7. The two parts of the control device are fixed to each other for rotary motion by means of three projections 14 of member 12 having the form of rods and engaging the apertures 8 of collar 7. A ring 15 is fixed onto the end faces of projections 14, for instance by means of electric welding. Ring 15 cooperates with collar 7 and limits accordingly the possible relative displacements in axial direction of the two parts of the control device. In the position represented in FIG. 1 these two parts are in one of their reltaive end positions, which is the closing position of the device. Said parts are retained in said closing position by latch 11 engaging notches 16 provided in projections 14. In this closed position of the device the gasket 10 is strongly compressed between rings 9 and 15. The compression thus exerted on gasket 10 causes in turn the same to be strongly pressed, on the one hand, against the cylindrical side surface of body member 6, and, on the other hand, against the inner cylindrical surface of the enlarged section 5 of tube 4 thus tightly closing the passage between stem 2 and tube 4.

Since the control device described has not to be actuated, when it is in closing position, very strong pressures can be exerted on gasket 10 without any risk of wear.

To actuate stem 2 an axial pull must first be exerted on member 12, thereby causing latch 11 to be removed from notches 16 and ring 15 to be moved away from gasket 10. During this first axial displacement of member 12 stem 2, which is kept in winding position by the setting lever spring, as well known to those skilled in the art, retains body member 6 immobile. When latch 11 has been removed from notches 16 and when the pressure exerted on gasket 10 has been released, member 12 can be rotated freely and drive stem 2 through body member 6 for winding up the watch movement.

To move the stem 2 from its winding position into its hand-setting position, it suffices to exert a second axial pull on member 12. The ring 15 carried by this member drives member 6 and stem 2 in axial direction. To return the control device into its closing position it suffices to push on member 12 until latch 11 enters again notches 16.

To keep the device represented tightly closed and to prevent water or dust from entering the watch movement while the control device described is actuated, a second sealing gasket 17 is fixed to the lower portion of member 12 by means of a ring 18.

While the control device represented in FIGS. 1 and 2 can be mounted on watches of any type, the control device according to the second embodiment (FIG. 3) is more particularly designed for golden watches. It also comprises a first part fixed to stem 2. The body member 6 of this part has the same shape as that of the first embodiment. Its collar 7 is however made integral with a cylindrical wall portion 19 covered by a golden cap 20 and having an outer diameter equal to that of the control member 21. The latter, which can be made of massive gold, is mounted on collar 7 in the same manner as member 12 in the first embodiment. Instead of making projections 14a integral with the control member, they are made here as independent pieces fixed to member 21 by riveting.

The shape of the two parts of the control device according to the second embodiment is moreover chosen so as to form an annular groove 22 therebetween. This groove 22 permits control member 21 to be pulled from its closing position without transmitting any pulling action to stem 2. For this purpose it suffices indeed to pull member 21 by gripping the same with two nails inserted into groove 22.

In the second embodiment the strength of latch 11 can be chosen without regarding the strength of the spring means retaining stem 2 in winding position. As a consequence, gasket 10 of the second embodiment can be pressed much stronger than in the first embodiment without having anything to change either in the watch movement or in the watch casing.

The other members of the device represented in FIG. 3 are moreover similar to the corresponding parts and members of the first embodiment and their operation is the same.

The part fixed to stem 2 of the control device according to the third embodiment (FIGS. 4 to 6) also comprises a body member 23 screwed onto the end of stem 2. This body member 23 is provided at its upper end with two ears 24 and it carries a ring 25 at its lower end. This ring 25 serves as abutting shoulder for a sealing gasket 26. This control device further comprises a second part which is movable with respect to the first one secured to stem 2. This second part substantially consists of a control member 27 having the same outer shape as the usual winding and hand-setting crowns. An annular piece 28 having a U-shaped cross section is mounted in member 27 so that the upper end of tube 4 can enter the space comprised between the two cylindrical wall sections of piece 28. This piece 28 is axially held in place within member 27 by means of a shoulder 29 and it holds ears 24 of member 23 within a lodging 30 provided in the bottom of member 27. The depth of lodging 30 is however greater than the thickness of ears 24 so as to permit the two parts of the control device to be moved in axial direction relative to each other. A self latching mechanism comprising a split ring 31 permits the two parts of the control device to be retained in the closing position represented in FIG. 4, in which the inner cylindrical wall section of piece 28 presses gasket 26 on ring 25 and causes in that way the gasket to be strongly pressed against the enlarged section of the tube 4 as well as against body member 23. A second sealing gasket 32 held within member 27 by ring 33 is also provided to ensure the tightness of the device when the same is actuated.

In order to prevent member 27 from rotating when this member is in the closing position represented in FIG. 4, ring 33 carries an inner toothing 34 in meshing relation with an outer toothing 35 formed in the lower part of the enlarged section of tube 4.

To actuate this control device a first axial pull must be exerted on member 27 as in the two first embodiments, thereby releasing gasket 26 and removing toothing 34 from toothing 35. During this first operation the part including member 27 moves alone in axial direction. At the end of this operation the device is in the position represented in FIG. 6. Member 27 can be rotated freely to ensure winding up the watch. If a second pull in axial direction is exerted on member 27, when the latter is in the position of FIG. 6, piece 28 drives ears 24 of body member 23 secured to stem 2 and it consequently brings the latter into its hand-setting position. To facilitate returning the control device into its closing position, the flanks of teeth 34 and 35 are cut so as to leave a substantial free play therebetween; these flanks can moreover be beveled.

The device represented in FIG. 7 constitutes a simplified form of the device of FIG. 4. It differs from the preceding embodiment chiefly in that it comprises only one sealing gasket which surrounds the protruding section 36 of the tube fixed to casing 1. In this fourth embodiment the control device also comprises a first unit secured to stem 2 and a second unit which is movably mounted on the first one and comprises control member 37. The first unit secured to stem 2 consists of sleeve 38 carrying ears 39 extending within a lodging 40 of member 37 for securing the two units of the device to each other for rotary motion.

In this embodiment member 37 also carries a piece 41 having a U-shaped cross section. This piece serves, on the one hand, to exert a pression on gasket 42, when the device is in closing position, and, on the other hand, to retain ears 39 within lodging 40.

A ring 43 fixed to member 37 holds gasket 42 by means of a washer 44 within member 37 when the control device is disassembled from the watch. When this device is on the contrary mounted on the watch, washer 44 lies on a shoulder 45 of tube section 36 and it is pressed onto this shoulder when the device is in closing position.

As regards the other parts and members of this fourth embodiment they operate in the same way as the similar parts of the preceding embodiments.

The embodiment represented in FIGS. 8 and 9 is particularly interesting, because of the means provided both for fixing the two parts of the device to each other for rotary motion and for limiting the relative axial displacements of these two parts. Said means extend partly into tube 46 fixed to casing 1. The total height of the device according to this fifth embodiment therefore only slightly exceeds that of the section of tube 46 protruding from casing 1.

The part of the device, which is secured to stem 2, substantially consists in this embodiment of a stud 47 screwed onto the end of stem 2 and provided with a collar 48 in its lower portion. The other part of the device comprises control number 49, a sleeve 50 set with force fit in member 49 and provided with two axially extending and diametrically opposed projections 51, and a sleeve 52 carrying a flange 53 and provided with a diametrical slot 54 extending across flange 53 as well as through an upper portion of the cylindrical wall of sleeve 52. To press gasket 55 on collar 48 in closing position the lower end face of sleeve 52 is cut so as to have a V-shaped cross section.

The two parts of the control device are secured to each other for rotary motion by a pin 56 inserted into a transverse bore of stud 47 and having its ends extending within slot 54 of sleeve 52. Pin 56 also serves as abutting means for limiting the relative axial displacements of the two parts of the control device.

To ensure a tight closure of the passage of stem 2 through opening 3 of casing 1, when the control device is actuated, the control member 49 thereof carries a further sealing gasket 57 which is held axially in place by a ring 58. A latching ring 59 holds the two parts of the control device in closing position, in which inwardly extending projections of ring 58 engage corresponding cutouts or lodgings provided in a collar of tube 46, thereby preventing member 49 from rotating in closing position.

The operation of the control device according to this last embodiment is similar to those of the former embodiments. It should, however, be observed that in closing position as well as in winding position, gasket 57 has at least a part engaging a thicker portion 60 of tube 46, thus increasing the action of gasket 57 in these two positions.

Tests made with a control device according to this last embodiment and mounted on a wrist-watch and having the same sizes as the usual crowns have shown that the device according to the invention still ensures a tight closure of the passage of stem 2, when the watch is under 1640 ft. of water. In winding position this improved device still ensures the tightness of the stem passage under external pressures ranging up to 430 lbs./sq. in., and in hand-setting position up to external pressures of 215 lbs./sq. in.

In considering the five embodiments disclosed it can be observed that all the members of these devices are mounted together so that each device can be handled as a single piece when assembling the watch. Furthermore, these improved devices can be mounted on any existing watch originally provided with a usual standard control device. Finally, if the control device of a watch in use is lost for any reason, for instance because the stem 2 has been broken incidentally or because of a defect, it can be replaced by any standard device, thus avoiding a complete loss of the watch.

Although several embodiments of the device according to the invention have been disclosed above in great detail, it should be understood that various changes in the shape, sizes and arrangement of parts will appear obvious to those skilled in the art within the scope of the appended claims.

I claim:

1. In an instrument comprising a movement enclosed in a casing, in combination, a casing part having a substantially cylindrical surface forming part of a passage extending across the casing wall, a stem extending through said passage substantially coaxially thereto and being adapted for transmitting motions from outside the casing to the movement enclosed therein, a first part secured to said stem and having a cylindrical portion extending in said passage substantially coaxially to the cylindrical surface thereof and in spaced relation therewith, a shoulder on said first part extending transversely from one end of said cylindrical portion thereof toward the cylindrical surface of said passage, an annular sealing gasket surrounding the cylindrical portion of said first part and engaging the cylindrical surface of said passage, and a second part including a control member and a pressing member and being fixed to said first part for rotary motion but shiftable with respect thereto between two axial positions: a working position, in which said pressing member is removed from said sealing gasket, and a closing position in which said pressing member strongly presses said gasket against said shoulder thereby causing said gasket to be strongly pressed both against the cylindrical portion of said first part and the cylindrical wall of said passage.

2. In an instrument according to claim 1, said parts being fixed to each other for rotary motion by means of at least one projection carried by one of said parts and of a lodging provided on the other part for each projection of said one part, the projections of said one part engaging the lodgings of the other part.

3. In an instrument according to claim 2, the projections and lodgings fixing said parts to each other for rotary motion constituting abutting means limiting the axial displacements of said second part relative to said stem and permitting the same to be moved in axial direction by means of said control member.

4. In an instrument according to claim 1, said parts carrying the elements of a spring mechanism automatically latching said second part in closing position upon its arrival in said position.

5. In an instrument according to claim 1, at least a projection and a corresponding depression being provided on said second part and on a casing part, said projection entering said depression when said second part is urged into its closing position, thereby preventing said second part from being rotated in closed position.

6. A device for controlling, from outside a casing, through a passage provided in the wall thereof, a mechanism located in said casing, comprising a motion transmitting stem extending through the passage provided in the wall of the casing and a control crown mounted on said motion transmitting stem for actuating the same, said control crown comprising two parts assembled together in a single unit so that said control crown can be handled as one piece when mounting the same on to or removing it from said stem, one of said parts being movable with respect to the other part in the direction of the axis of said stem from a working position, in which said control crown can be actuated and drive said stem, to a closing position, in which said control crown and said stem remain at rest, two facing surface portions, each on one of said parts, said surface portions moving toward each other when said movable part is moved from said working position into said closing position, and an annular sealing gasket extending between said surface portions of said parts and being strongly pressed between said surface portions when said movable part is in closed position thus being able to close tightly the passage of said stem through the casing wall, said sealing gasket being relaxed when said movable part is in working position.

References Cited by the Examiner

UNITED STATES PATENTS 2,773,347   12/56   Froidevaux _____ 58—90

FOREIGN PATENTS 308,031   6/55   Switzerland.

LEYLAND M. MARTIN, *Primary Examiner.*

LEO SMILOW, *Examiner.*